United States Patent
Troccola

[19]

[11] Patent Number: 6,141,891
[45] Date of Patent: Nov. 7, 2000

[54] SNOW PLOW COVER

[76] Inventor: Joseph M. Troccola, Awnings Are Us, 12 E. Hayestown Rd., Danbury, Conn. 06811

[21] Appl. No.: 09/258,352

[22] Filed: Feb. 26, 1999

Related U.S. Application Data

[60] Provisional application No. 60/115,800, Jan. 14, 1999.

[51] Int. Cl.[7] .................................................. B65D 65/02
[52] U.S. Cl. .............................. 37/196; 150/166; 296/136
[58] Field of Search .................................... 150/154, 161, 150/166; 52/3, DIG. 14; 37/196, 266; 296/136; 428/99

[56] References Cited

U.S. PATENT DOCUMENTS

| | | |
|---|---|---|
| 1,871,101 | 8/1932 | Witz . |
| 2,801,667 | 8/1957 | Curran . |
| 3,454,108 | 7/1969 | Skrurud . |
| 3,620,309 | 11/1971 | Erickson et al. . |
| 4,243,231 | 1/1981 | Sugawara . |
| 4,479,287 | 10/1984 | Asaka . |
| 4,858,985 | 8/1989 | Wojcik . |
| 5,217,275 | 6/1993 | Ridge ................................... 296/136 X |
| 5,244,246 | 9/1993 | Cunningham ........................ 150/166 X |
| 5,522,409 | 6/1996 | May . |
| 5,564,232 | 10/1996 | Callaway . |
| 5,605,369 | 2/1997 | Ruiz .......................................... 296/136 |
| 5,662,372 | 9/1997 | Lubkeman . |
| 5,664,825 | 9/1997 | Henke et al. ......................... 150/166 X |
| 5,745,932 | 5/1998 | Barovetto . |
| 5,763,031 | 6/1998 | Huang . |
| 5,806,873 | 9/1998 | Glassman ............................. 150/166 X |

FOREIGN PATENT DOCUMENTS

| | | |
|---|---|---|
| 1278974 | 11/1961 | France . |
| WO86/03538 | 6/1986 | WIPO . |
| WO94/23153 | 10/1999 | WIPO . |

*Primary Examiner*—H. Shackelford
*Attorney, Agent, or Firm*—Richard C. Litman

[57] ABSTRACT

A snow plow cover for protecting a snow plow blade and a mounting and a motion control attached thereto harness from environmental elements during periods of non-use. The snow plow cover is configured to form fit and envelop the snow plow blade and mounting and motion control harness attached thereto. The cover is formed of a tarpaulin type material and includes grommets for anchoring the cover either to the ground or for tying the cover about the snow plow.

9 Claims, 9 Drawing Sheets

SNOW PLOW COVER

CROSS-REFERENCE TO RELATED APPLICATION

This application claims the benefit of U.S. Provisional Patent Application Ser. No. 60/115,800, filed Jan. 14, 1999.

BACKGROUND OF THE INVENTION

1. Field of the Invention

The present invention relates generally to snow plow covers, and more particularly, to snow plow covers divided into two joined sections, for protecting a snow plow blade and its mounting harness from harsh environmental elements during periods of non-use.

2. Description of Related Art

U.S. Pat. No. 3,454,108 issued Jul. 8, 1969, to Skrukrud, discloses. a detachable weather shield for plow blades having a blade treating lubricant for protecting the plow blade from the elements during periods of non-use. U.S. Pat. No. 3,620,309 issued Nov. 16, 1971, to Erickson et al., discloses (see FIG. 3) a fabric type cover 1 for plow blades 2 having an elastic band 4 for keeping the cover 1 in place over the plow blade 2; however, the cover 1 does not protect the mounting harness 3 of the plow blade 2.

U.S. Pat. No. 4,243,231 issued Jan. 6, 1981, to Sugawara, discloses a grommet for use in a graphite type tarpaulin sheet that forms an air tight seal about the grommet. U.S. Pat. No. 4,479,287 issued Oct. 30, 1984, to Asaka, discloses metal grommet reinforcing eyeholes in a sheet-like article. U.S. Pat. No. 4,858,985 issued Aug. 22, 1989, to Wojcik, discloses a tarpaulin vehicle cover having a frame for holding the cover over the vehicle. U.S. Pat. No. 5,522,409 issued Jun. 4, 1996, to May, discloses a collapsible vehicle cover for protecting the vehicle from environmental elements.

U.S. Pat. No. 5,564,232 issued Oct. 15, 1996, to Callaway, discloses a tarpaulin retaining device for securing a tarpaulin to the ground. U.S. Pat. No. 5,662,372 issued Sep. 2, 1997, to Lubkeman, discloses flexible weather cover for motorcycle type vehicles that fits snugly around the vehicle and rider so as to protect from environmental conditions. U.S. Pat. No. 5,745,932 issued May 5, 1998, to Barovetto, discloses a hottub enclosure for keeping the environment from affecting the hot tub.

U.S. Pat. No. 5,763,031 issued Jun. 9, 1998, to Huang, discloses reinforced tarpaulin having reinforced grommets. French Pat. Document No. 1,278,974 published Nov. 6, 1961 shows collapsible vehicle shelter. World Pat. Document No. WO86/03538 published Jun. 16, 1986 shows sheet material for covering a scaffold to protect the workers for the elements. World Pat. Document No. WO94/23153 published Oct. 13, 1994 shows a clamp for securing a protective sheet to a scaffold.

None of the above inventions and patents, taken either singly or in combination, is seen to describe the instant invention as claimed.

SUMMARY OF THE INVENTION

Essentially, the invention is a snow plow cover, dimensioned and configured to cover both the snow plow blade and its harness from the elements during periods of non-use of the plow. Preferably, the cover is made of a tarpaulin-type material. The cover is primarily divided into two joined sections, a forward section and a rearward section, with two grommet reinforcing eyelets located on the top portion of the cover, for receiving elongated guiding antennas that project from a snow plow blade covered with the snow plow cover, and grommet reinforced eyelets located along the bottom perimeter of the cover for securing the snow plow cover to the ground.

Accordingly, it is a principal object of the invention to provide a snow plow cover sized to fit both the snow plow and its attendant harness during periods of non-use of the plow.

It is another object of the invention to provide a snow plow cover formed of a flexible material.

It is a further object of the invention to provide a snow plow cover that is form fitted.

Still another object of the invention is to provide a form fitted snow plow cover made of a flexible material that can be secured to a snow plow and to the ground.

It is also an object of the invention to provide a snow plow cover formed of a flexible material that is universally fitted over a snow plow.

Still another object of the invention is to provide a universally fitted snow plow cover made of a flexible material that can be secured to a snow plow, about a snow plow, or to the ground.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
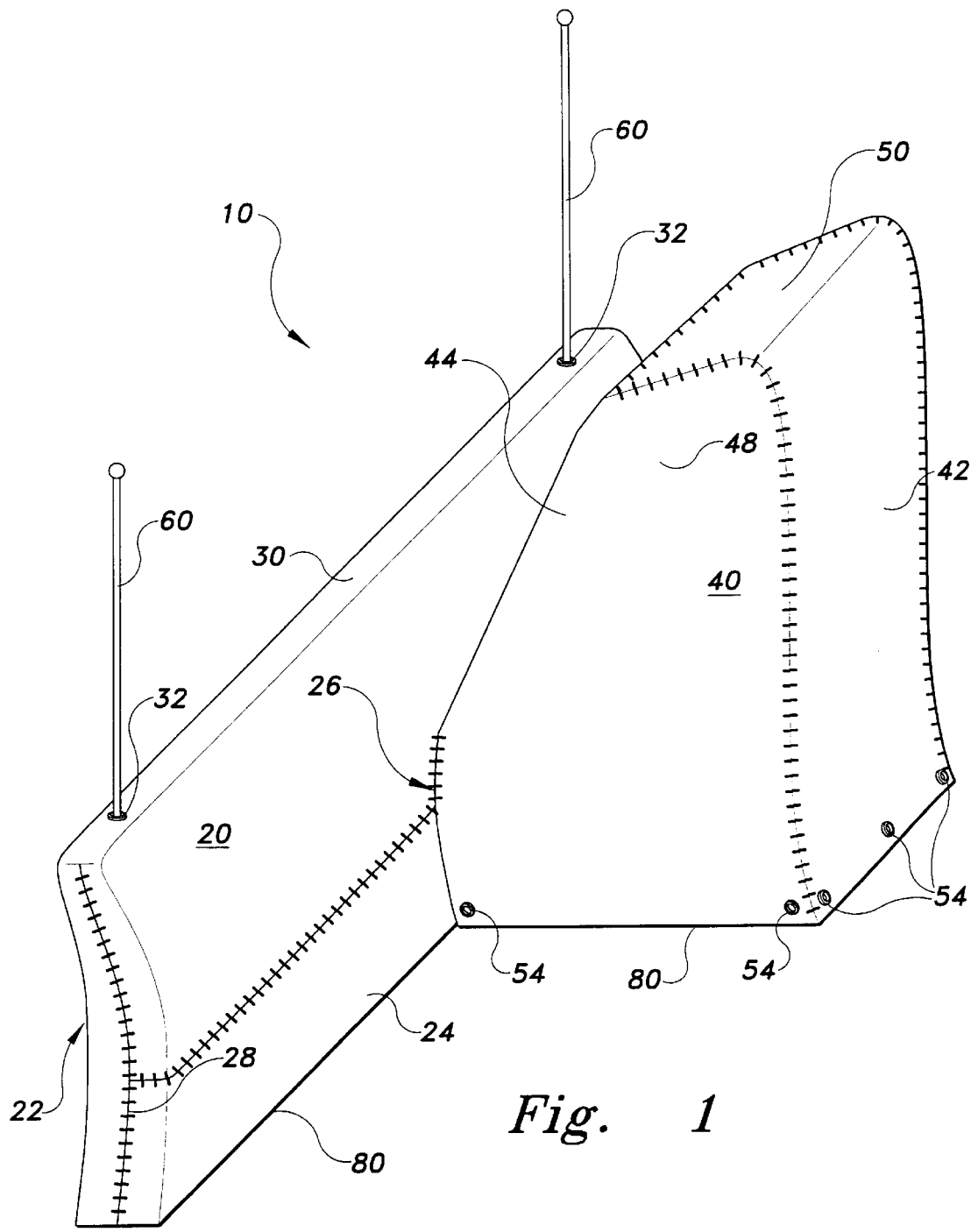
FIG. 1 is an environmental view of a snow plow cover according to the present invention.
Figure 2:
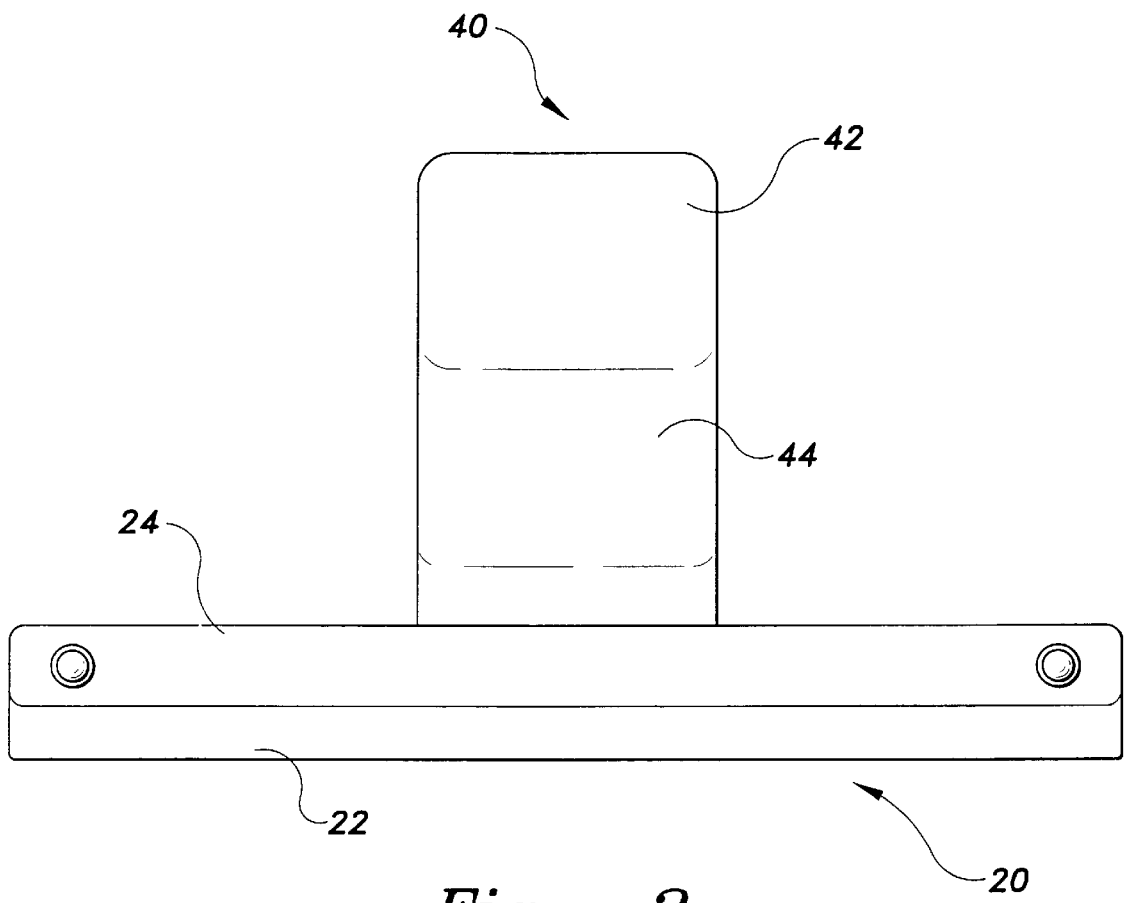
FIG. 2 is a top elevational view of a snow plow cover according to the present invention.
Figure 8:
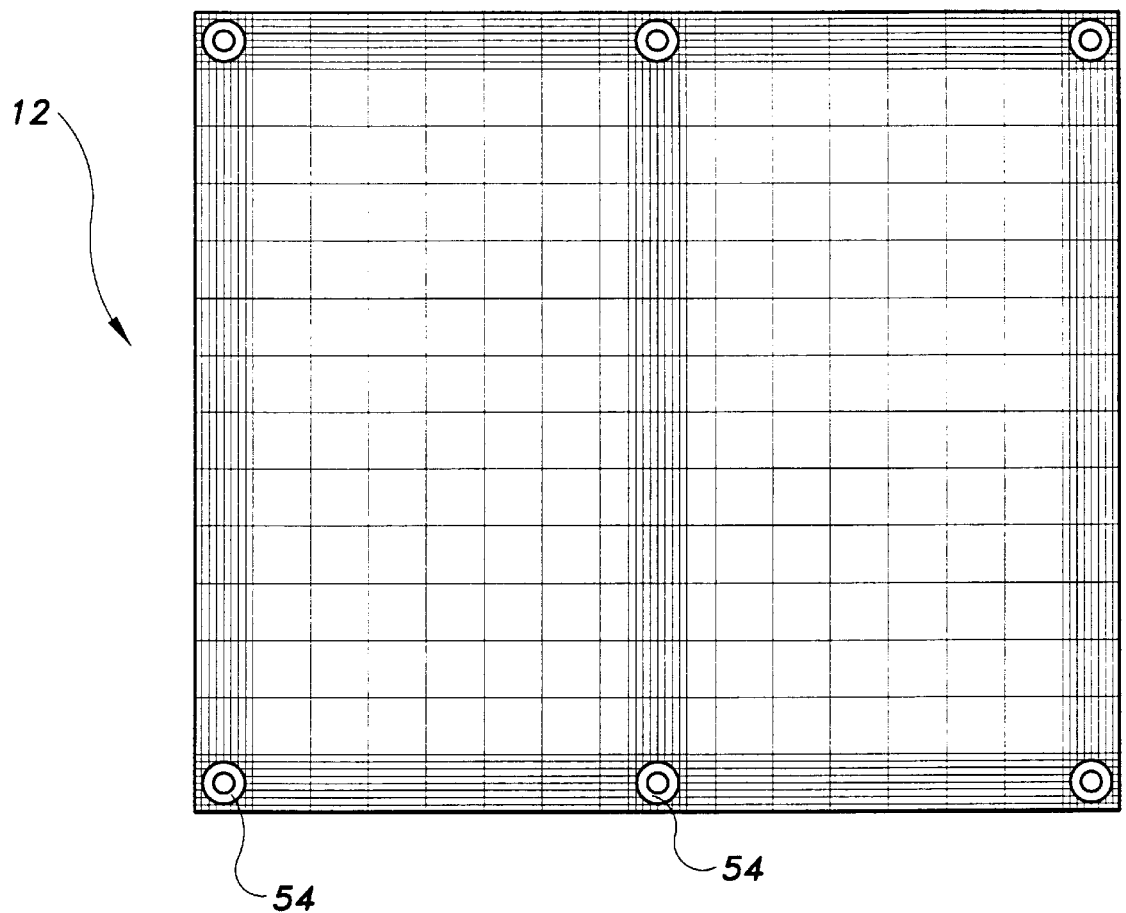
FIG. 8 is a top plan view of a prior art tarpaulin flexible sheet for cover objects.

The present invention is a snow plow cover for protecting a snow plow from environmental elements during periods of non-use. As seen in FIGS. 1 and 2, the snow plow cover 10 is made up of a tarpaulin or flexible material 12 such as shown in FIG. 8 and as disclosed in U.S. Pat. No. 5,763,031 issued Jun. 9, 1998, to Huang, herein incorporated by reference. The flexible material 12 is shaped to completely cover the snow plow blade (not shown) and the mounting and motion hydraulic system (also not shown) of a snow plow. The flexible material 12 is primarily divided into two sections, a forward section 20 and a rearward section 40.

The forward section 20 is configured to form fit and envelop the snow plow blade. The forward section 20 includes a solid rectangular front panel 22, and a rectangular back panel 24. The rectangular back panel 24 has a portion 26 for joining the forward section 20 to the rearward section 40. The rectangular front panel 22 and a rectangular back panel 24 are joined together by a pair of vertical side seams 28, and an integral top portion 30. The top portion 30 includes two grommet reinforced eyelets 32 disposed at opposite ends thereof. The two grommet reinforced eyelets 32 allow the elongated guiding antennas 60 of the plow blade to extend through the top portion 30.

The rearward section 40 includes a solid rectangular back panel 42 and a rectangular front panel 44. The rectangular front panel 44 has a portion 26 for matingly joining the rearward section 40 with the forward section 20. The front panel 44 and the back panel 42 are joined together by a pair of vertical side seams 48, and an integral top portion 50 for enveloping the mounting and hydraulic harness (not shown) of the snow plow. In a preferred embodiment, the forward section 20 has a height about one-half the height of said rearward section 40, and said rearward section 40 has a width about one-third the width of the forward section 20.

Figure 9:
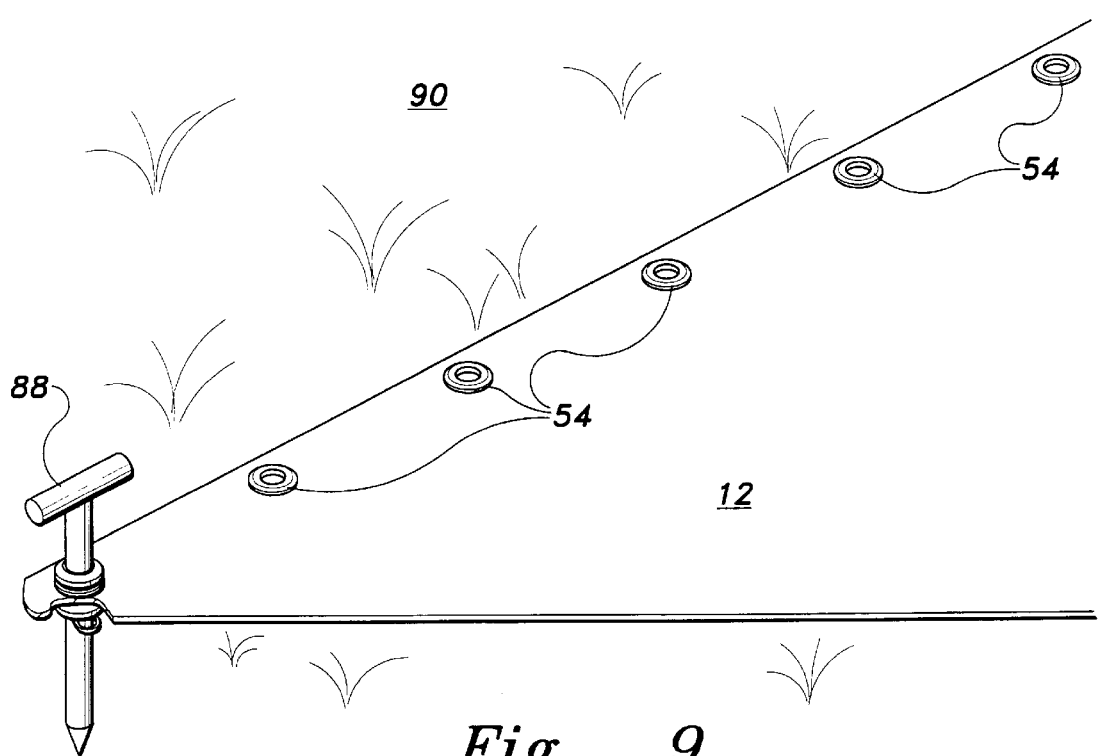
FIG. 9 is an environmental perspective view of a prior art tarpaulin sheet anchoring device.

The portions forward section 20 to the rearward section 40 are preferably seamed together at portion. The joined forward section 20 and the rearward section 40 have a shared common bottom perimeter region 80. A plurality of grommet reinforced eyelets 54 are disposed along the bottom perimeter 80 at various locations. The grommet reinforced eyelets 54 receive anchoring devices 88 such as shown in FIG. 9 and as disclosed in U.S. Pat. No. 5,564,232 issued Oct. 15, 1996, to Callaway, herein incorporated by reference, for securing the flexible material 12 about the snow plow to the ground 90. Likewise, the received anchoring devices may include a binding material (such as rope, twine, etc.) for tying the flexible material 12 about the snow plow.

Figure 3:
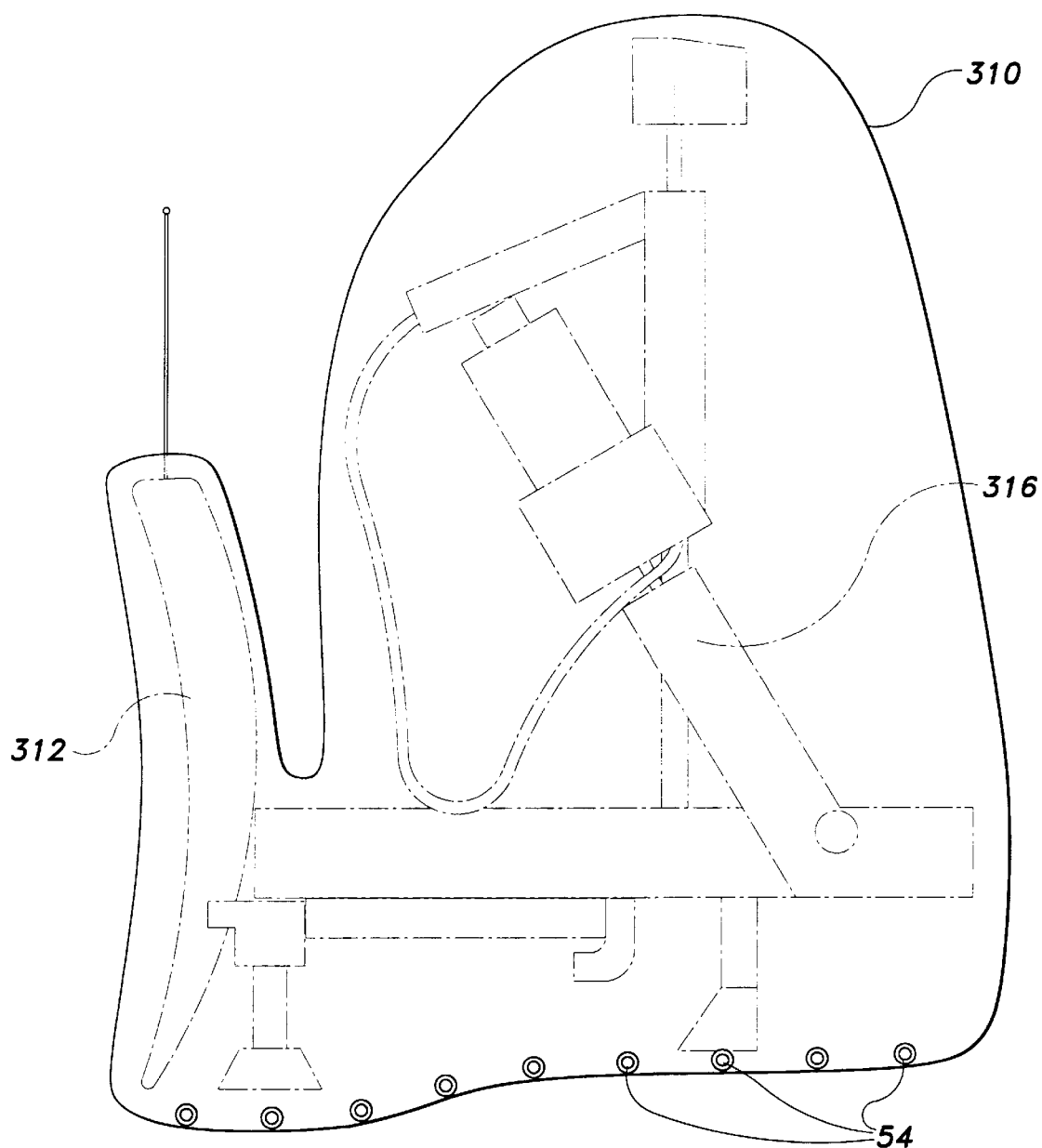
FIG. 3 is a side elevational view of a snow plow cover according to a first embodiment the present invention.

FIGS. 3–6 are representative side views of the invention in various configurations. More specifically, FIG. 3 is an side elevational view of the snow plow cover 310 about the snow plow. The snow plow cover 310 illustrates the first embodiment of the invention as shown in FIGS. 1 and 2. The snow plow cover 310 has the same forward section 20, and the rearward section as shown in FIGS. 1 and 2. Together, these two sections form an envelope around the snow plow protecting the snow plow blade 312 and the mounting and motion harness 316 from the elements.

Figure 4:
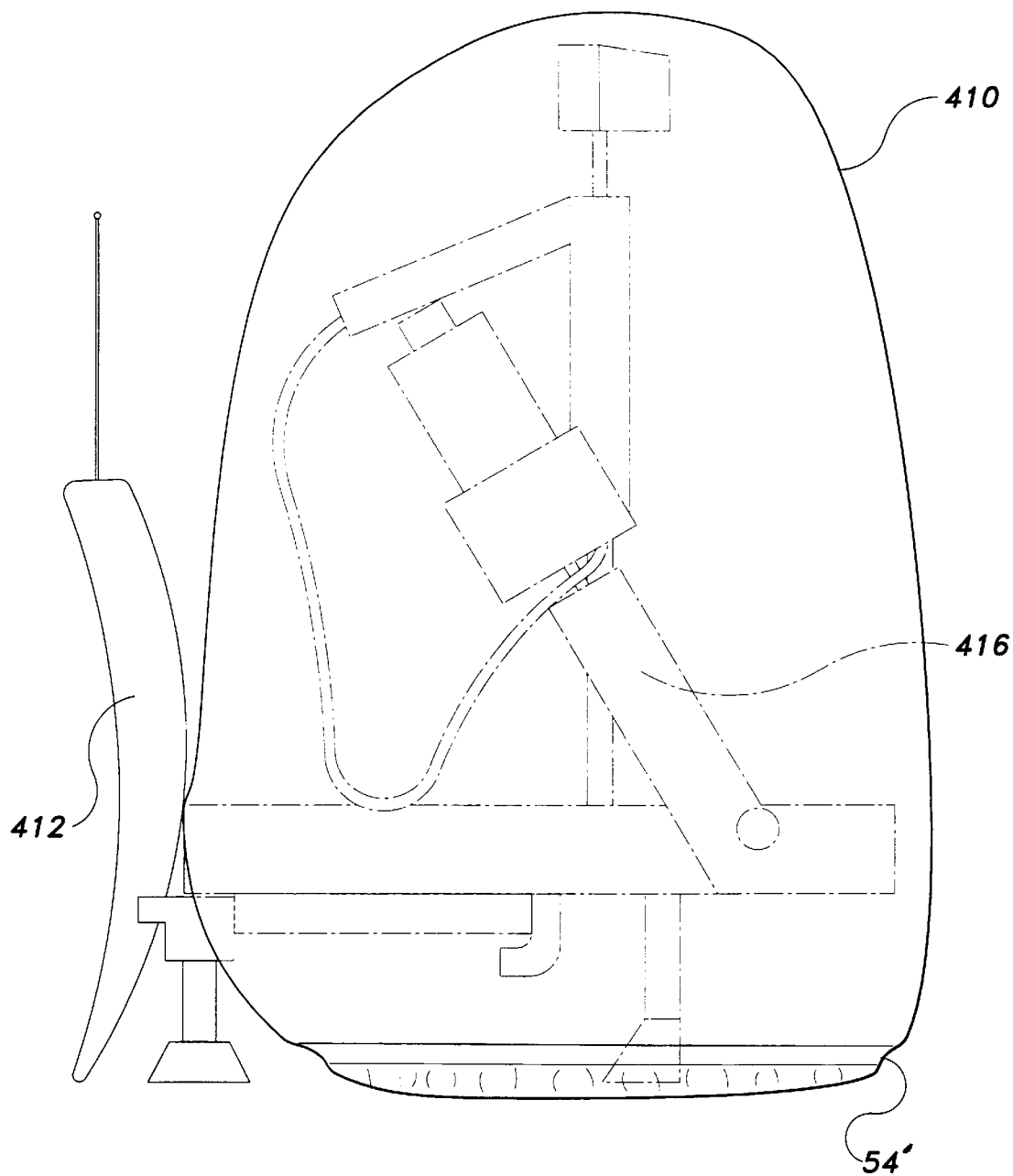
FIG. 4 is a side elevational view of a snow plow cover according to a second embodiment the present invention.

The next embodiment as seen in FIG. 4, illustrates a particular form fitted snow plow cover 410 designed specifically for protecting the mounting and motion harness 416. The snow plow cover 410 basically consists of the corresponding rearward section 40 of the snow plow cover of FIGS. 1 and 2. The snow plow cover 410 of FIG. 4 provides special protection of the mounting and motion harness 416 from extreme hostile weather environments. In addition, the snow plow cover 410 of FIG. 4 may be used during actual snow plowing procedures. In this manner, the snow plow cover 410 maintains the mounting and motion harness 416 free of grit and grime generated while plowing with the plow blade 412.

Figure 5:
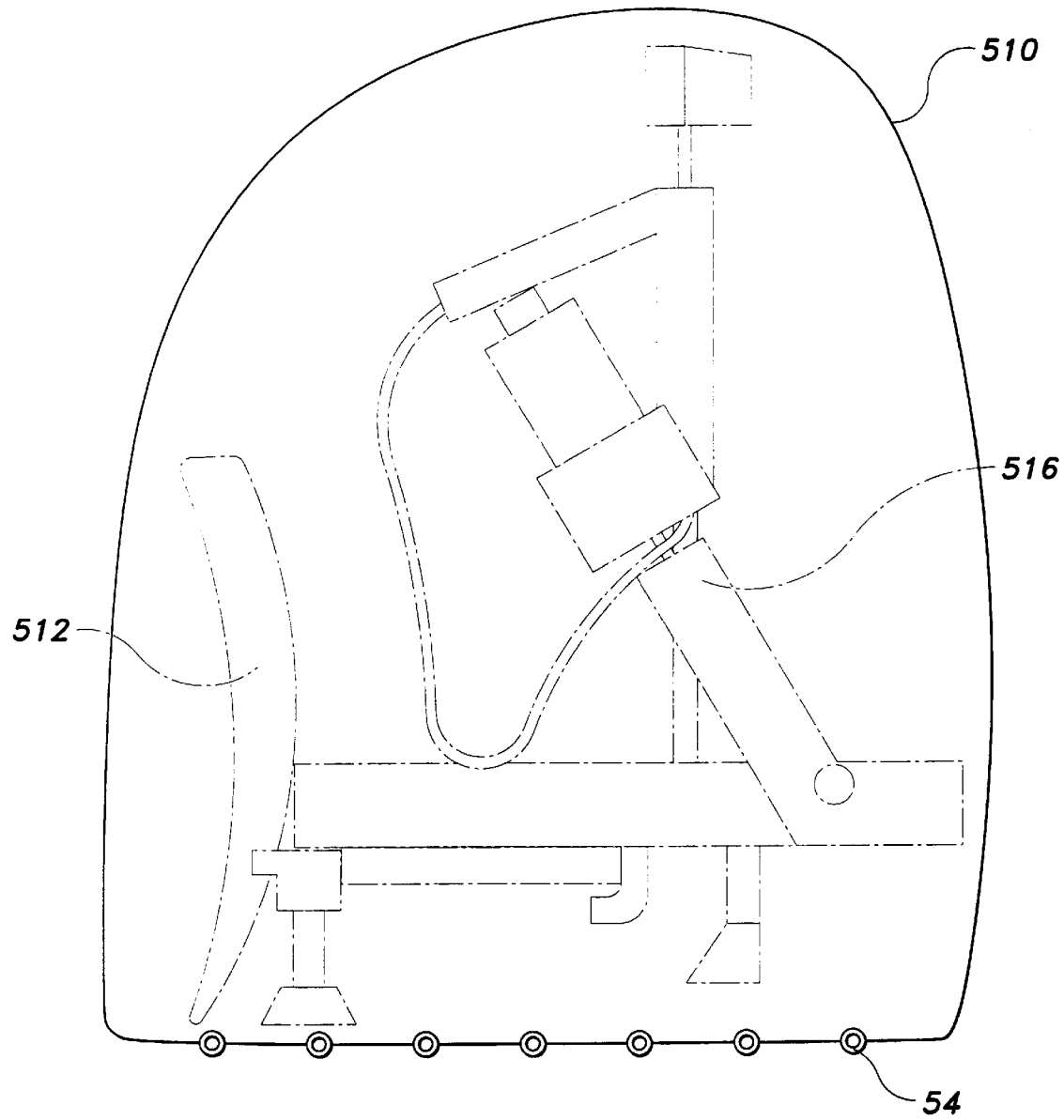
FIG. 5 is a side elevational view of a snow plow cover according to a third embodiment the present invention.

FIG. 5 shows another variation of the invention, a universally fitted snow plow cover 510. The snow plow cover 510 is a basic semi-ovular shaped cover that is a general purpose cover for snow plows. The snow plow cover 510 completely envelopes the snow plow blade 512 and the mounting and motion harness 516.

Figure 6:
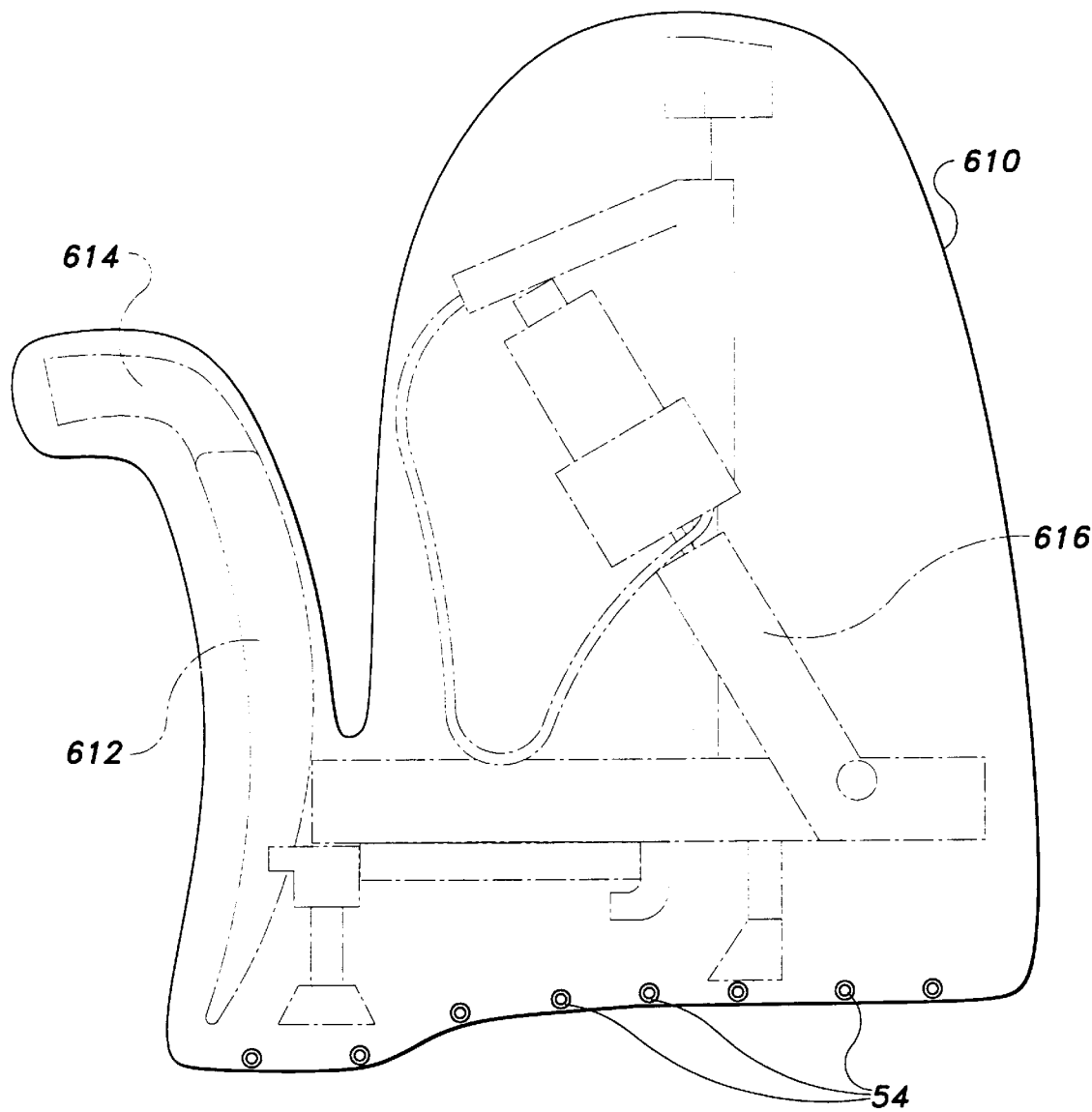
FIG. 6 is a side elevational view of a snow plow cover according to a fourth embodiment the present invention.
Figure 7:
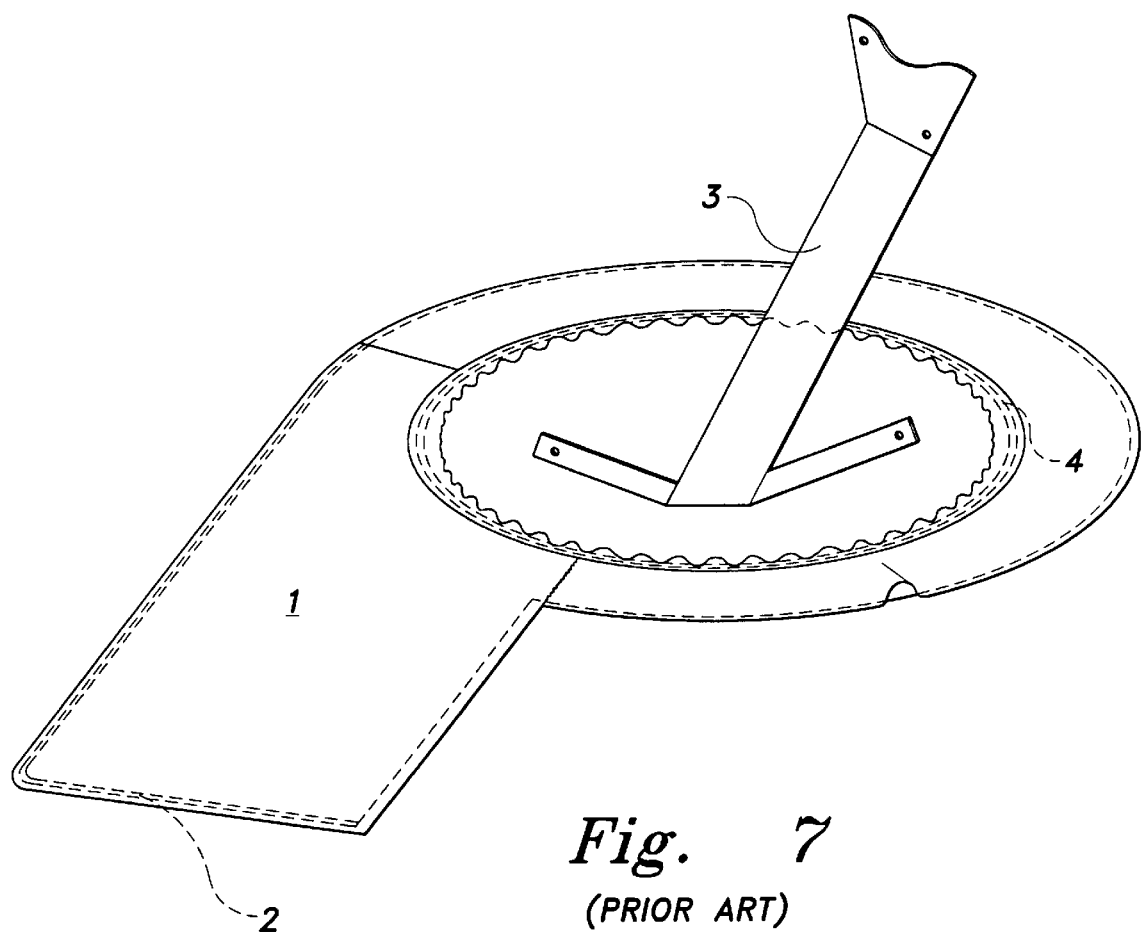
FIG. 7 is a perspective view of a prior art agricultural plow blade cover.

FIG. 6 illustrates a snow plow cover 610, which is an extended version of the snow plow cover 310 of FIG. 3. The snow plow cover 610 is form fitted to protect a snow plow used in extra heavy plowing operations. The snow plow includes a snow plow blade 612 having an extended top ridge 614 suitable for cupping and moving a greater volume of snow.

In each of the snow plow covers of FIGS. 1–6, a plurality of grommets are provided for securing the snow plow covers of FIGS. 1–6 about the snow plow blade (312, 412, 512, and 612) and the mounting and motion harness (316, 416, 516, and 616). The grommets 54 provide reinforced eyelets for tying down the snow plow covers of FIGS. 1–6 with rope to the ground or to the snow plow. Likewise, the grommets may be substituted with tubular channel 54' (note FIG. 4) around the bottom periphery of the snow plow covers of FIGS. 1–6. The tubular channel 54' is used to gather the perimeter around the bottom of the snow plow. The gathering is accomplished by providing the tubular channel 54' with either a rope (forming a drawstring tie-down), or a resilient member (such as an elastic band) that can be stretched around the snow plow and returns to a relax form for fixing the snow plow covers of FIGS. 1–6 to the snow plow. In addition, any other suitable securing device is appropriately useable to fasten the snow plow covers of FIGS. 1–6 to the snow plow, to the ground, or any supporting platform.

It is to be understood that the present invention is not limited to the embodiments described above, but encompasses any and all embodiments within the scope of the following claims.

I claim:

1. A snow plow cover, for protecting a snow plow from environmental elements during periods of non-use wherein the snow plow contains a snow plow blade, and a mounting and a motion hydraulic harness system attached thereto, comprising:

a flexible material having a forward section, and a rearward section, said forward section and said rearward section being cojoined and forming a bottom perimeter therearound;

said forward section being sized and dimensioned for enveloping a snow plow blade of a snow plow, said forward section including a rectangular front panel, a rectangular back panel having a back joining portion, a pair of vertical sides having seams therealong, and a top portion coupling said front panel, said back panel, and said vertical sides, said top portion having at least one eyelet disposed therein for permitting the extension of an elongated protuberance therethrough;

said rearward section being sized and dimensioned for enveloping a mounting and hydraulic harness of a snow plow; and means for securing said flexible material about the snow plow; said means for securing being disposed about said bottom perimeter.

2. The snow plow cover according to claim 1, said rearward section including at least a solid rectangular back panel, a rectangular front panel having a front joining portion, a pair of vertical sides having seams therealong, and a top portion coupling said back panel, said front panel, and said vertical sides;

wherein said back joining portion and said front joining portion being matingly joined together thereby coupling said forward section to said rearward section.

3. The snow plow cover according to claim 1, said means for securing comprises a plurality of eyelets disposed along said bottom perimeter.

4. The snow plow cover according to claim 3, wherein each said eyelet comprises a reinforcing grommet.

5. The snow plow cover according to claim 3, wherein each of said eyelets receives an anchoring device for securing said flexible material to a ground surface.

6. The snow plow cover according to claim 3, wherein said means for securing said flexible material further including a rope means for threading through said plurality of eyelets.

7. A snow plow cover, for protecting a snow plow from environmental elements during periods of non-use wherein the snow plow contains a snow plow blade, and a mounting and a motion hydraulic harness system attached thereto, comprising:

a flexible material having a forward section, and a rearward section, said forward section and said rearward section being cojoined and forming a bottom perimeter therearound;

said forward section being sized and dimensioned for enveloping a snow plow blade of a snow plow;

said rearward section being sized and dimensioned for enveloping a mounting and hydraulic harness of a snow plow;

said forward section having a height about one-half the height of said rearward section, and said rearward section having a width about one-third the width of the forward section; and means for securing said flexible material about the snow plow; said means for securing being disposed about said bottom perimeter.

8. The snow plow cover according to claim 7, wherein said means for securing said flexible material about the snow plow including a tubular channel having a means for gathering said perimeter of said flexible material about the snow plow.

9. The snow plow cover according to claim 8, wherein said means for gathering is chosen from the group consisting essentially of resilient bands, rope, cords, and drawstrings.

\* \* \* \* \*